US006920146B1

(12) United States Patent
Johnson et al.

(10) Patent No.: US 6,920,146 B1
(45) Date of Patent: Jul. 19, 2005

(54) SWITCHING DEVICE WITH MULTISTAGE QUEUING SCHEME

(75) Inventors: C Stuart Johnson, Liberty Lake, WA (US); Greg W. Davis, Spokane, WA (US); Timothy S Michels, Spokane, WA (US)

(73) Assignee: Packet Engines Incorporated, Spokane, WA (US)

( * ) Notice: Subject to any disclaimer, the term of this patent is extended or adjusted under 35 U.S.C. 154(b) by 0 days.

(21) Appl. No.: 09/166,343

(22) Filed: Oct. 5, 1998

(51) Int. Cl.[7] .......................... H04L 12/28; H04L 12/56; H04L 12/54
(52) U.S. Cl. ........................ 370/415; 370/413; 370/389; 370/392; 370/429
(58) Field of Search .............................. 370/413, 415, 370/389, 392, 429, 378, 381, 395, 414, 356, 363, 368, 379, 412, 428; 710/53

(56) References Cited

U.S. PATENT DOCUMENTS

| 5,214,639 A | 5/1993 | Herion ........................ 370/60 |
| 5,361,255 A | 11/1994 | Diaz et al. |
| 5,386,413 A | 1/1995 | McAuley et al. |

(Continued)

FOREIGN PATENT DOCUMENTS

| EP | 0 828 403 A1 | 3/1998 |

OTHER PUBLICATIONS

Information Sciences Institute, University of Southern California, Transmission Control Protocol, "DARPA Internet Program Protocol Specification," 1–81, RFC 793, http://www.ietf.org/rfc/rfc0793.txt, Sep. 1981.
Hiutema, Christian, "Multicast," Routing in the Internet, Chapter 11, pp. 235–260, Prentice–Hall, Inc., Englewood Cliffs, New Jersey, 1995.
Tanenbaum, Andrew S., "The Network Layer," Computer Networks, Chapter 5, pp. 339–478, Third Edition, Prentice–Hall, Inc., Englewood Cliffs, New Jersey, 1996.
Acampora, Anthony S., "Issues in Traffic Control and Performance Management," An Introduction to Broadband Networks, Chapter 6, pp. 223–240, Plenum Press, New York, New York, 1994.
"Switching Basics," *High–Speed Networking with LAN Switches,* by Gilbert Held, chapter 2, pp. 33–61 (1997).
"Frame Switching, Routing, and Protocols," *Fast Ethernet,* by Liam B. Quinn and Richard G. Russell, chapter 7, pp. 109–147 (1997).
"Switched Ethernet and Fast Ethernet Standards," *Switched and Fast Ethernet: How It Works and How to Use It,* by Robert Breyer and Sean Riley, chapter 3, pp. 41–78 (1995).
U.S. Appl. No. 09/166,603, filed Oct. 5, 1998, Michels et al.
U.S. Appl. No. 09/166,620, filed Oct. 5, 1998, Michels et al.
U.S. Appl. No. 09/776,940, filed Sep. 6, 2000, Michels et al.
European International Search Report dated Mar. 19, 2002 from corresponding European application No. EP 99 11 9105, published Apr. 12, 2000.

*Primary Examiner*—Chi Pham
*Assistant Examiner*—Ronald Abelson
(74) *Attorney, Agent, or Firm*—Michael Blaine Brooks PC; Craig A. Hoersten; V. Lawrence Sewell

(57) ABSTRACT

In a switching device, a method of communicating data packets from sending ports to destination ports includes storing in a first stage queue packet-related data from a sending port; determining from the packet-related data which destination ports are to receive the packet-related data in the first stage queue; storing in a second stage queue associated with each determined destination port the packet-related data from the first stage queue; and using the packet-related data in the second stage queue to complete the communication of the data packet from the sending port to each determined destination port. Apparatus for practicing the method comprises a first stage queue storing packet-related data from a sending port; and a second stage queue associated with each of a set of destination ports storing the packet-related data from the first stage queue.

31 Claims, 2 Drawing Sheets

U.S. PATENT DOCUMENTS

| | | | | |
|---|---|---|---|---|
| 5,414,704 A | | 5/1995 | Spinney | |
| 5,459,724 A | | 10/1995 | Jeffrey et al. | 370/60 |
| 5,583,861 A | | 12/1996 | Holden | |
| 5,608,726 A | | 3/1997 | Virgile | 370/401 |
| 5,748,905 A | | 5/1998 | Hauser et al. | |
| 5,796,944 A | | 8/1998 | Hill et al. | |
| 5,875,189 A | * | 2/1999 | Brownhill et al. | 370/395.7 |
| 5,895,500 A | | 4/1999 | Thomason et al. | |
| 5,905,725 A | | 5/1999 | Sindhu et al. | 370/389 |
| 5,909,440 A | | 6/1999 | Ferguson et al. | |
| 5,909,686 A | | 6/1999 | Muller et al. | |
| 5,938,736 A | | 8/1999 | Muller et al. | |
| 5,946,679 A | | 8/1999 | Ahuja et al. | |
| 5,953,318 A | * | 9/1999 | Nattkemper et al. | 370/236 |
| 5,978,359 A | * | 11/1999 | Caldara et al. | 370/236 |
| 5,982,771 A | * | 11/1999 | Caldara et al. | 370/389 |
| 6,006,306 A | | 12/1999 | Haywood et al. | |
| 6,011,795 A | | 1/2000 | Varghese et al. | |
| 6,023,466 A | | 2/2000 | Luijten et al. | |
| 6,032,190 A | | 2/2000 | Bremer et al. | |
| 6,128,295 A | * | 10/2000 | Larsson et al. | 370/389 |
| 6,161,144 A | | 12/2000 | Michels et al. | |
| 6,185,552 B1 | | 2/2001 | DeLong et al. | |
| 6,219,352 B1 | * | 4/2001 | Bonomi et al. | 370/417 |
| 6,259,699 B1 | * | 7/2001 | Opalka et al. | 370/398 |
| 6,289,094 B1 | * | 9/2001 | Miloslavsky | 370/352 |
| 6,295,295 B1 | * | 9/2001 | Wicklund | 370/392 |
| 6,320,864 B1 | * | 11/2001 | Hebb et al. | 370/412 |
| 6,396,834 B1 | * | 5/2002 | Bonomi et al. | 370/394 |

* cited by examiner

SWITCHING DEVICE WITH MULTISTAGE QUEUING SCHEME

TECHNICAL FIELD

This invention relates generally to network switching devices. More particularly, this invention relates to a method and means for forwarding data packets through a switching device.

BACKGROUND OF THE INVENTION

A local area network (LAN) is a system for directly connecting multiple computers so that they can directly exchange information with each other. LANs are considered local because they are designed to connect computers over a small area, such as an office, a building, or a small campus. LANs are considered systems because they are made up of several components, such as cables, repeaters, switches, routers, network interfaces, nodes (e.g., computers), and communication protocols. Ethernet is one such protocol. Information is communicated through a LAN in frames transported within data packets. ("Frame" and "data packet," while technically different, are often used interchangeably to describe data carrying the information.)

A LAN switch (or, more generally, a packet switch) is generally defined as a multi-port device that transfers data between its different ports based on the destination addresses and/or other information found in the individual packets it receives. Switches can be used to segment LANs, connect different LANs, or extend the collision diameter of LANs. Switches are of particular importance to Ethernet-based LANs because of their ability to increase network diameter. Additional background information on packet switches can be found in a number of references such as *Fast Ethernet* (1997) by L. Quinn et al., *Computer Networks* (3rd Ed. 1996) by A. Tannenbaum, and *High-Speed Networking with LAN Switches* (1997) by G. Held, all of which are incorporated herein by reference.

Packet switches generally carry three types of traffic: unicast, multicast and broadcast. Unicast traffic consists of packets that travel from a source, or entry, port to a single destination, or exit, port. Multicast traffic consists of packets that travel from one sending port to many destination ports per a destination list within a packet. Broadcast traffic is a special case of multicast traffic wherein the destination list includes all destination ports, and as such issues surrounding multicast apply equally to broadcast traffic.

Multicast traffic poses a problem for packet switches because multicast packets must be replicated within the packet switch. This replication can cause packet switches to fall behind in transmitting frames that follow the multicast frame due to the time required for replication. This replication time is particularly apparent in crossbar switch architectures that require unimpeded access from the sending port to the destination ports to schedule transmission, as the sending port must wait for other traffic that is destined for the destination port to complete. Shared memory switch architectures do not suffer the same fate as all ports have access to the switch memory independent of each other. In shared memory switches, a packet is stored in a central memory and the sending port makes a forwarding decision that notifies the destination ports of the packet's location for transmit. Each destination port can pull a multicast packet from its storage location independent of the other ports. However, in shared memory switches, the response of the destination ports to the forwarding decision can be time-consuming where, for example, it involves a multicast packet. Each of the destination ports on the destination list must request the packet from the shared memory. The time required for this delays further forwarding decisions and can cause congestion in the sending port if additional traffic is received there while the destination ports complete their requests.

Congestion in packet switches can be caused in many ways. In cases where there is more than one port transmitting to a single destination port, congestion at the destination port can occur and the port is said to be oversubscribed. The ratio of the rate that traffic is generated at the sending ports to the rate the destination port can transmit is called the oversubscription ratio. Rate mismatches in the source network media and destination network media can also cause congestion (another case of oversubscription). For example, if traffic travels from port 0 to port 1 on a switch and port 0 runs at 100 megabits per second and port 1 runs at 10 megabits per second, traffic can easily back up waiting to exit port 1. Traffic shaping can also cause congestion. This is a process where the destination port is intentionally curbed back to a lower transmit rate than it is capable for traffic engineering purposes.

Normal packet network traffic does not allow steady state oversubscription. No network switching equipment can buffer infinite data, so oversubscribed conditions on ports are inherently limited by the storage capabilities of the network equipment. However, it is also normal network behavior to have bursts for short periods of time during which network ports will be oversubscribed for any or all of the reasons previously listed. High port count switching equipment creates the opportunity for high oversubscription ratios during these normal traffic bursts.

End stations (such as a node within a LAN) communicate through a packet network by establishing a channel called a session. This session has characteristics that remain constant during the conversation between the end stations. For example, if station A talks to station B through the packet network to transfer a file, when A sends packets, they are all labeled with B's network address as the destination, and A's network address as the source. Other information in the packets sent between A and B will also generally remain constant for a given session—priority, VLAN, network protocol, etc. Each station in a packet network may run multiple sessions with the same or different destination stations. In general, packets within these sessions must arrive in sequence at their destinations—that is, the network equipment must not re-order them.

As a packet from a given session enters a packet switch, the switch must evaluate fields within the packet and make a forwarding decision (where does the packet go?). After making a forwarding decision, packet switches with egress queuing must place multicast packets on more than one transmit queue (a queue being first in/first out storage). As network media speeds increase, the time allowed to perform these queuing operations shrinks. Egress port congestion aggravates this issue. High oversubscription ratios that result from normal packet network operation force egress queuing mechanisms to queue packets from many sources simultaneously to maintain predictable operation. The more work the queuing mechanism performs to handle congestion, the harder it is to perform multicast packet replication.

An objective of this invention, therefore, is to provide a method and means for enhancing the communication of packets, such a multicast packets, through a switching device.

SUMMARY OF THE INVENTION

In a switching device, a method of communicating data packets from sending ports to destination ports includes storing in a first stage queue packet-related data from a sending port; determining from the packet-related data which destination ports are to receive the packet-related data in the first stage queue; storing in a second stage queue associated with each determined destination port the packet-related data from the first stage queue; and using the packet-related data in the second stage queue to complete the communication of the data packet from the sending port to each determined destination port. Apparatus for practicing the method comprises a first stage queue storing packet-related data from a sending port; and a second stage queue associated with each of a set of destination ports storing the packet-related data from the first stage queue.

These and other aspects, features, and advantages of the invention are described in an illustrative embodiment below in conjunction with the following drawings.

DETAILED DESRIPTION OF AN ILLUSTRATIVE EMBODIMENT

Overview

Figure 1:
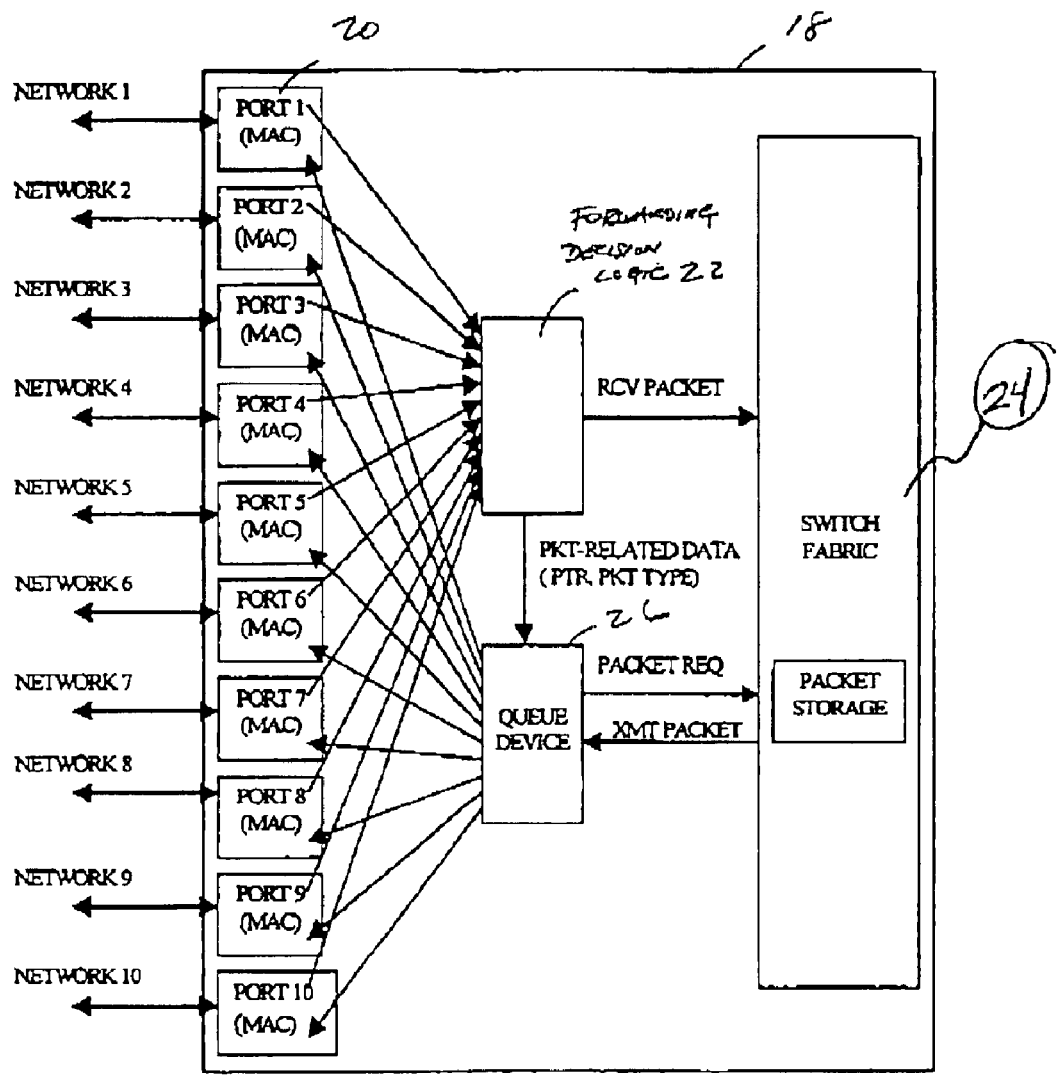
FIG. 1 is an overall block diagram of a packet switch in accordance with the invention.

As a session's packets travel through the packet network, they may take different paths to the same destination based on data field contents in their packets. For example, a video conference session between station A and B may be marked as priority 7, VLAN 5 while an email session between the same two stations may be marked as priority 3, VLAN 12 even though the sessions have the same source and destination. As a result of these differences in the sessions, the packets in the data streams may take physically different routes through the network. The sessions may also take the same route through the network, but be serviced differently by the network equipment—a packet from one session may come into a switch after a packet from a different session, yet exit the switch first as a result of higher priority servicing.

Network switches can examine these data fields in each packet to classify it. This invention takes advantage of packet classification to reduce the bandwidth burden of queuing multicast packets during congested intervals. This is accomplished by identifying classifications (characteristics) of packets that are independent of whether a packet is unicast or multicast. By doing this, queuing can be broken up into stages such that the first stage is only concerned with a broad range of packet types (and potentially sessions) that are destined for any port in a group of ports. Further stages can then service these queues as appropriate and perform additional queuing for multicast by replicating the packet for each destination port. The multicast replication still occurs within the switch, but is not required to occur immediately as the first stage of queuing acts as a buffer for the subsequent stages. This allows for the absorption of normal bursty oversubscription conditions while maintaining session servicing consistency (packet ordering).

An example of this invention is a two stage queuing scheme whereby the first stage queues packets based solely on their priority. All sessions with a given priority are given equal weight in the first stage queue. Note that these include multicast and unicast sessions. All packets within a session are placed in a single queue, thus maintaining packet ordering requirements. A second stage queue services or empties the priority queues into port queues, expanding multicast packets onto multiple queues if necessary. Since the first stage queues are not required to expand multicast packets onto multiple destination ports, fewer queuing operations are required to queue the packets to their destinations in the first stage. Multicast replication is handled by second stage queuing mechanisms. This allows more ports to be effectively utilized in normal bursty oversubscribed packet network conditions due to rate mismatches, traffic shaping, oversubscription and port density. This is increasingly important as network media speeds achieve gigabit per second and beyond.

The operation of the illustrative embodiment is such that the multistage queuing is not visible except during congested intervals on ports receiving multicast traffic. That is, it is transparent during normal operation and operates as a performance enhancement during peak utilization.

Note that this invention is not limited to the use of priority as a first stage queuing criteria. This is an arbitrary session characteristic that was chosen as a classification rule, which could as easily have been network protocol type or type of service. Note also that this invention is not limited to egress queuing devices, and may have applications in ingress queuing packet switches. Nor is this invention limited to a two stage queuing pipeline.

Structure and Function

FIG. 1 is a block diagram of a portion of a switching device 18 in accordance with the invention. The switching device includes a number of bidirectional ports 20 (numbered individually as ports 1 through 10) each which includes a media access control (MAC) and forwarding decision logic 22. For purposes of this description, a port that acquires a data packet from an external entity such as a network, node, station, etc., for example, and forwards the packet internally to another port is referred to as an entry or sending port. A port that receives a data packet internally and transmits the data packet to an external entity is referred to as an exit or destination port. Also shown within the switch 18 is a switch fabric 24 and a queuing device 26. Other portions of the switching device, which can be conventional in nature, are not shown and are not described because they are not germane to the invention.

The MAC and forwarding decision logic 22 within each port can be conventional in design. Through them a sending port acquires a data packet and forwards it to one or more destination ports. The process for communicating forwarding decision is made by the forwarding decision logic based on destinations listed in the data packet. The forwarding decision logic 22 forwards to the queuing device information (packet-related data) such as a pointer to where the packet is stored in the switch fabric (if the fabric is shared memory), the type of packet (priority, etc.) and to which ports the packet is to be communicated (one port for unicast, multiple ports for multicast, and all but the sending port for broadcast). The forwarding decision logic also stores the data packet in the switch fabric 24 at the location indicated by the pointer.

The switch fabric 24 in the illustrative embodiment is a shared memory that stores the entire data packet and from which destination ports may retrieve a copy. However, the invention is not limited to shared memory architectures. The switch fabric may be of other architectures such as a crossbar matrix.

Figure 2:
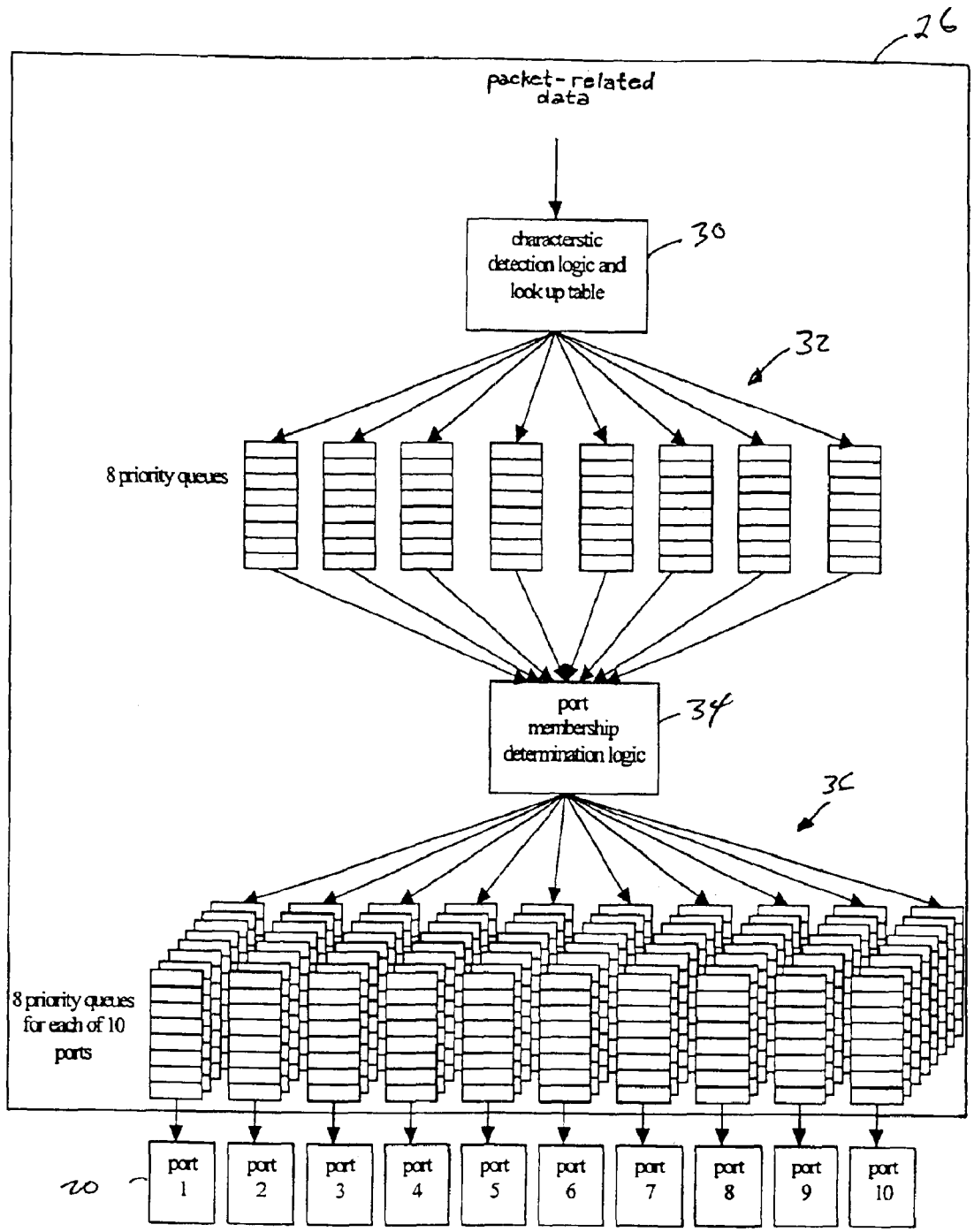
FIG. 2 is a block diagram of a queuing device within the packet switch of FIG. 1.

The queuing device 26, which receives the packet-related data from the forwarding decision logic 22, is shown in more detail in FIG. 2. The device 26 includes characteristic detection logic 30, a first stage queue 32 coupled to the output of the detection logic, port membership determination logic 34 coupled to the output of the first stage queue, and second stage logic 36 coupled to the output of the determination logic.

The characteristic detection logic 30 detects from the packet-related data a characteristic of the packet (e.g., priority) as well as determining from a destination list which ports are to retrieve the packet. The destination list in the illustrative embodiment is encoded in the packet-related data as a number, which is used by the logic 30 to look up the associated port group in a look up table. Other means may also be used for indicating the destination ports, such as passing the port numbers directly within the packet-related data.

The first stage queue 32 stores the packet-related data according to a characteristic of the packet. In the illustrative embodiment, that characteristic is the priority of the packet (from one to eight levels). Consequently the first stage queue includes multiple first queues, each one storing the packet-related data (pointer plus port group) for packets of a different priority level in the order in which they are received.

The port determination logic 34 reads the first stage queue according to a service scheme and determines from the packet-related data which destination ports are to receive the packet-related data in the first stage. The logic 34 then stores the pointers in the appropriate portion of the second stage queue 36.

The second stage queue 36 in the illustrative embodiment includes for each port connected to the queuing device a set of queues that correspond to the first stage queue. For example, the first stage queue includes eight priority queues, and the second stage queue includes for each of its connected ports a corresponding set of eight priority queues. With this arrangement, the pointers in each queue of the first stage queue can be easily copied into a corresponding queue in the second state queue for each determined destination port.

The queuing device also includes conventional logic (not shown in FIG. 2 for clarity) for requesting packets from the switch fabric 24 (packet req.) and for forwarding packets from the switch fabric to the destination ports (xmt packet). This conventional logic is included in the queuing device in the illustrative embodiment as an implementation choice. However, the logic could just as well be separate from the queuing device if desired.

Operation

A data packet communicated from a sending port of switch 18 to one or more destination ports travels through the switching device as follows. A data packet that is received by a port is processed by its MAC, which generates a well formed frame from the physical LAN interface. The MAC presents the packet to the forwarding decision logic 22 that classifies the packet type and makes a forwarding decision as to which ports the packet is to be sent to from a destination list within the packet. The forwarding decision logic 22 transfers the packet to a location in the switch fabric (shared memory in the illustrative embodiment). The forwarding decision logic 22 also generates the packet-related data which includes the type of packet, a pointer to the location in shared memory where the packet is stored, and the forward decision and sends this data to the queuing device 26.

The queuing device receives the packet-related data at detection logic 30 and stores it in the first stage queue 32. In the process of storing the data in the first stage queue the logic determines which from the data ports, if any, the packet should be queued for. The logic then stores the pointer and destination port information in an appropriate queue within the first stage queue. In the illustrative embodiment the data is stored in a queue based on the priority of the packet; other characteristics of a packet can also be used for determining where the data will be stored.

The queuing device, through the determination logic 34, then obtains data from the multiple queues of the first stage in accordance with a scheme for reading the queues, such as a priority servicing scheme where the characteristic is priority. The determination logic 34 determines from the packet-related data just obtained which destination ports are to receive the pointer(s) and transfers the pointers to an appropriate location in the second stage queue 36 associated with each determined destination port. In the illustrative embodiment the second stage queue includes multiple queues for each port that correspond to the multiple queues of the first stage queue. In this embodiment, with priority as the packet characteristic, the logic 36 transfers the pointers to the priority queue for each port corresponding to the priority queue for the pointer in the first stage queue.

The queuing device then uses the data in the second stage queue to complete the communication of the data packet from the sending port to each determined destination port. When servicing the second stage queue with a service scheme, the queuing device obtains pointers from the queues to packets in the switch fabric 24 and requests these packets from the switch fabric. The switch fabric responds by sending the pointed-to packet to the queuing device, which then directs it to the appropriate port. Where there are multiple destination ports such in the case of a multicast data packet, the queuing device makes separate requests for each port.

The queuing device 26 is shown in the output or transmit path of the switch 18. In this configuration, the switch is said to be a "transmit buffered" or "output buffered" device. For different switch architectures like crossbar, the queuing device may reside on the inbound side of the switch, but the invention may still be applied. In that application, it would be referred to as "input buffered" since the queues are stored at the sending ports of the switching device.

Having understood the principles of the invention from the embodiments of the invention shown and described herein, those of skill in the art will recognize that the embodiments can be modified in arrangement and detail without departing from such principles. The construction of the various modules can be varied while still providing the functions described. Elements of the various modules can be implemented in hardware, software, or firmware as desired. The packet-related data may be pointers, other structures, or the data packets themselves. The invention may be used where appropriate in any packet switching device such as a LAN switch, a router, etc.

In view of the many possible embodiments to which the principles of the invention may be applied, it should be understood that these embodiments are illustrative only and should not be taken as a limitation on the scope of the invention. The invention, rather, is defined by the following claims. We therefore claim as the invention all embodiments that may come within the scope of these claims and their equivalents.

We claim:

1. In a switching device, apparatus for communicating data packets from sending ports to destination ports, comprising:

a first stage queue comprising a plurality of first queues for storing packet-related data from a sending port, wherein the packet-related data is stored in the plurality of first queues based on a characteristic of the data packets;

a second stage queue associated with each of a set of destination ports, the second stage queue comprising a plurality of second queues, each of the plurality of second queues for storing the packet-related data from each of the plurality of first queues of the first stage queue based on a characteristic of the data packets; and a switch fabric coupled to the second stage queue, the switch fabric using the packet-related data in the second stage queue for transmitting the data packets to a destination port.

2. The apparatus of claim 1 including means for determining from the packet-related data which destination ports are to receive the packet-related data in the first stage queue.

3. The apparatus of claim 1 including address resolution logic sending the packet-related data from the sending port to the first stage queue.

4. The apparatus of claim 1 wherein each second stage queue includes multiple second queues, the packet-related data stored in a specific second queue based on the characteristic of the data packets.

5. The apparatus of claim 1 wherein the switch fabric is a shared memory switch fabric for communicating data packets from sending ports to destination ports.

6. The apparatus of claim 1 wherein the switch fabric is a crossbar matrix for communicating data packets from sending ports to destination ports.

7. In a switching device, a method for communicating data packets from sending ports to destination ports, the method comprising:

storing in a first stage queue a pointer to memory storing a data packet and a list of destination ports;

identifying a destination port stored in the first stage queue; retrieving the pointer to memory stored in the first stage queue;

storing in a second stage queue associated with the identified destination port the retrieved pointer to memory; and using the pointer to memory in the second stage queue to complete the communication of the data packet from the sending port to the identified destination port.

8. The method of claim 7, wherein the first stage queue includes multiple first queues, and the step of storing the pointer to memory in the first stage queue comprises storing the pointer in a specific first queue based on a characteristic of the packet.

9. The method of claim 7, wherein the second stage queue includes multiple second queues, and the step of storing the retrieved pointer to memory in the second stage queue comprises storing the retrieved pointer in a specific second queue based on a characteristic of the packet.

10. In a switching device, a method of communicating data packets from one or more sending ports to destination ports, the method comprising:

storing, in a first stage queue comprising a plurality of first queues, packet-related data associated with the data packets from the one or more sending ports, wherein the packet-related data are stored in one of the plurality of first queues based on a characteristic of the data packets; determining from the packet-related data which destination ports are to receive the packet-related data in the first stage queue;

storing in a second stage queue associated with each determined destination port the packet-related data from the first stage queue; and transmitting the packet-related data in the second stage queue to a switch fabric for completing the communication of the data packet from the sending port to each determined destination port.

11. The method of claim 10 wherein the switch fabric is a shared-memory switch fabric, and the transmitting comprises using the packet-related data to obtain a copy of the data packets from the shared-memory switch fabric to complete communication of the data packet.

12. The method of claim 10 wherein the switch fabric is a crossbar matrix, and the transmitting comprises using the packet-related data to form connections in the matrix so as to communicate simultaneously a copy of the data packets from the sending port to each of the determined destination ports.

13. In a switching device, a method of communicating data packets from sending ports to destination ports, the method comprising:

storing in a first stage queue packet-related data from a sending port;

determining from the packet-related data which destination ports are to receive the packet-related data in the first stage queue;

storing in a second stage queue associated with each determined destination port the packet-related data from the first stage queue based on network protocol type; and transmitting the packet-related data in the second stage queue to a switch fabric for completing the communication of the data packet from the sending port to each determined destination port.

14. In a switching device, a method of communicating data packets from sending ports to destination ports, the method comprising:

storing in a first stage queue packet-related data from a sending port;

determining from the packet-related data which destination ports are to receive the packet-related data in the first stage queue;

storing in a second stage queue associated with each determined destination port the packet-related data from the first stage queue based on whether the data packets are unicast packets or multicast packets; and transmitting the packet-related data in the second stage queue to a switch fabric for completing the communication of the data packet from the sending port to each determined destination port.

15. In a switching device, a method of communicating data packets from sending ports to destination ports, the method comprising:

storing in a first stage queue the data packets from a sending port;

determining from the data packets which destination ports are to receive the data packets in the first stage queue;

storing in a second stage queue associated with each determined destination port the data packets from the first stage queue based on a characteristic of the data packets; and transmitting the data packets in the second stage queue to a switch fabric for completing the communication of the data packet from the sending port to each determined destination port.

16. A multistage queuing apparatus for transmitting data packets from one or more sending ports to a plurality of destination ports, comprising:

a first queue structure, operatively coupled to the one or more sending ports, comprising a plurality of first queues for storing packet-related data associated with the data packets based on a first characteristic of the data packets; and a second queue structure, operatively coupled to the first queue structure and plurality of destination ports, comprising a plurality of second queues for storing the packet-related data based on the first characteristic and a second characteristic.

17. The multistage queuing apparatus of claim 16, wherein the first characteristic is priority.

18. The multistage queuing apparatus of claim 16, wherein the first characteristic is network protocol type.

19. The multistage queuing apparatus of claim 16, wherein the first characteristic is type of service.

20. The multistage queuing apparatus of claim 16, wherein the second characteristic is a destination port number associated with the plurality of destination ports.

21. A multistage queuing apparatus for transmitting data packets from one or more sending ports to a plurality of destination ports, comprising:

a first queue structure, operatively coupled to the one or more sending ports, comprising a first array of two or more first queues for storing the packet-related data associated with the data packets in accordance with a first characteristic of the data packets; and a second queue structure comprising a plurality of second arrays, each of the second arrays comprising two or more second queues operatively coupled to one of the plurality of destination ports, wherein each of the second arrays is adapted to store the packet-related data from the first queue structure in accordance with the first characteristic.

22. The multistage queuing apparatus of claim 21, wherein the dimension of the first array is the same as the dimension of each of the plurality of second arrays.

23. The multistage queuing apparatus of claim 21, wherein the apparatus further includes port determination logic interposed between the first queue structure and second queue structure to determine to which of the plurality of destination ports to transmit the packet-related data.

24. In a switching device, a method of communicating data packets from sending ports to destination ports, the method comprising:

storing in a first stage queue packet-related data from a sending port based on a characteristic of the data packets;

determining from the packet-related data which destination ports are to receive the packet-related data in the first stage queue;

storing in a second stage queue associated with each determined destination port the packet-related data from the first stage queue; and transmitting the packet-related data in the second stage queue to a switch fabric for completing the communication of the data packet from the sending port to each determined destination port.

25. The method of claim 24 wherein the packet-related data comprises a pointer to memory.

26. The method of claim 24 wherein the packet-related data is a data packet.

27. The method of claim 24 wherein the first stage queue comprises a plurality of first queues, and the step of storing the packet-related data in the first stage queue comprises storing the packet-related data in one of the plurality of first queues based on the characteristic of each of the data packets.

28. The method of claim 24 wherein the packet characteristic is priority.

29. The method of claim 24 wherein the packet characteristic is network protocol type.

30. The method of claim 24 wherein the packet characteristic is type of service.

31. The method of claim 24 wherein the packet characteristic is packet type comprising a unicast type and multicast type.

* * * * *